United States Patent [19]

Fricano

[11] Patent Number: 5,015,370

[45] Date of Patent: May 14, 1991

[54] APPARATUS AND METHOD FOR TREATING WELL WATER

[76] Inventor: Anthony Fricano, 3885 Luther Rd., Silver Springs, N.Y. 14550

[21] Appl. No.: 363,498

[22] Filed: Jun. 8, 1989

[51] Int. Cl.$^5$ .................... B01D 21/30; B01D 19/00
[52] U.S. Cl. .................... 210/138; 210/170; 210/188; 210/218; 210/299; 210/194; 261/36.1; 261/100; 261/108; 261/DIG. 75; 166/267
[58] Field of Search ............ 210/188, 218, 722, 138, 210/194, 195.1, 205, 220, 221.2, 257.1, 258, 260, 299, 750, 765, 747, 758, 170; 261/36.1, 100, 108, DIG. 75, DIG. 7; 166/68, 68.5, 265, 267

[56] References Cited

U.S. PATENT DOCUMENTS

| | | | |
|---|---|---|---|
| 2,811,258 | 10/1957 | Schleyer et al. | 210/218 |
| 3,017,951 | 1/1962 | Wiley | 55/52 |
| 3,193,989 | 7/1965 | Sebeste | 55/164 |
| 3,248,098 | 4/1966 | Cornelius | 261/DIG. 7 |
| 3,649,533 | 3/1972 | Reijonen et al. | 210/722 |
| 4,094,789 | 6/1978 | Kemper | 210/188 |
| 4,478,765 | 10/1984 | Tubbs | 210/170 |
| 4,543,186 | 9/1985 | Weisenbarger et al. | 210/221.2 |
| 4,675,115 | 6/1987 | Hasselbring | 210/673 |
| 4,735,750 | 4/1988 | Damann | 261/DIG. 75 |
| 4,762,176 | 8/1988 | Miller | 210/188 |
| 4,780,215 | 10/1988 | Carlson | 210/722 |
| 4,830,111 | 5/1989 | Jenkins et al. | 166/68.5 |

*Primary Examiner*—Stanley Silverman
*Assistant Examiner*—Cynthia L. Nessler
*Attorney, Agent, or Firm*—Hodgson Russ Andrews Woods & Goodyear

[57] ABSTRACT

An apparatus and method for treating well water to remove dissolved minerals and entrained gases. An aerator is disposed within a well, the aerator being located being the frost line and the water table. Water from the reservoir within the well and/or from the associated pressure tank is directed through the aerator so that the aerator will cause gases such as hydrogen sulfide to be released from the water, and will also cause dissolved iron and manganese to oxidize and precipitate out of the water so that the quality of the water within the reservoir is substantially improved. The water flow through the aerator will preferably be controlled by the operation of a solenoid operated valve which may in turn be operated by a timer to cause periodic recycling of the water through the aerator and back into the reservoir.

9 Claims, 2 Drawing Sheets

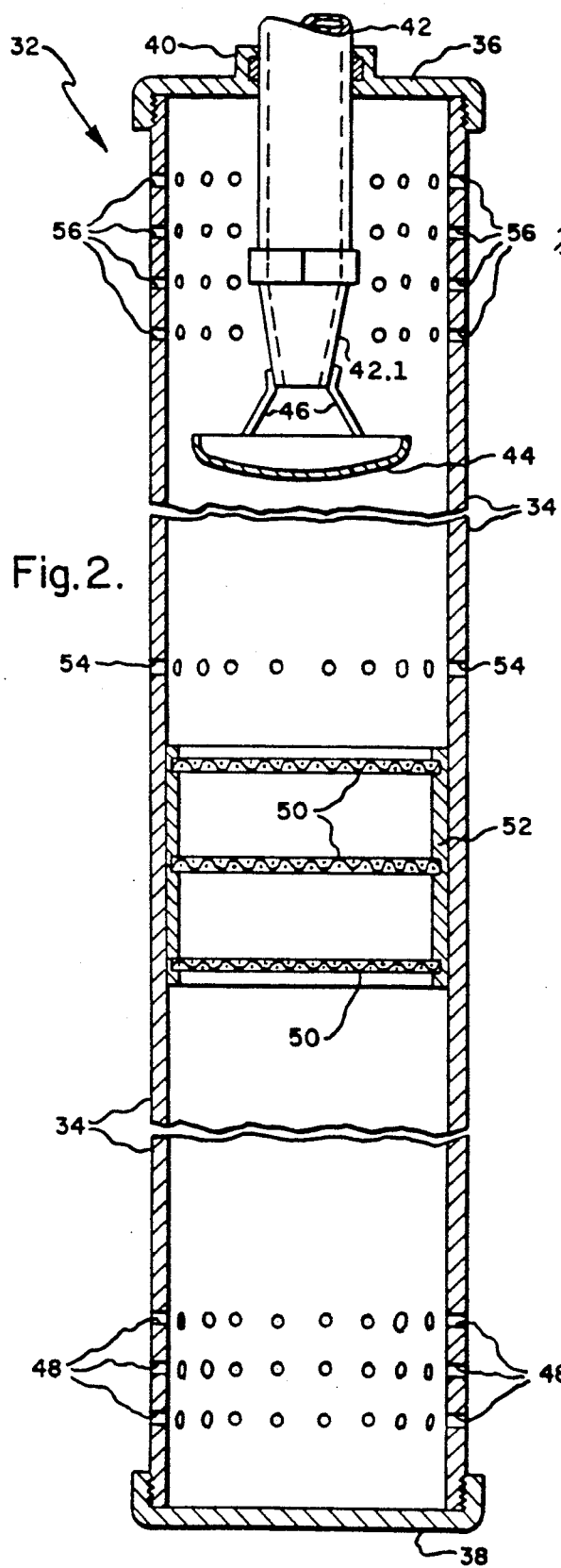
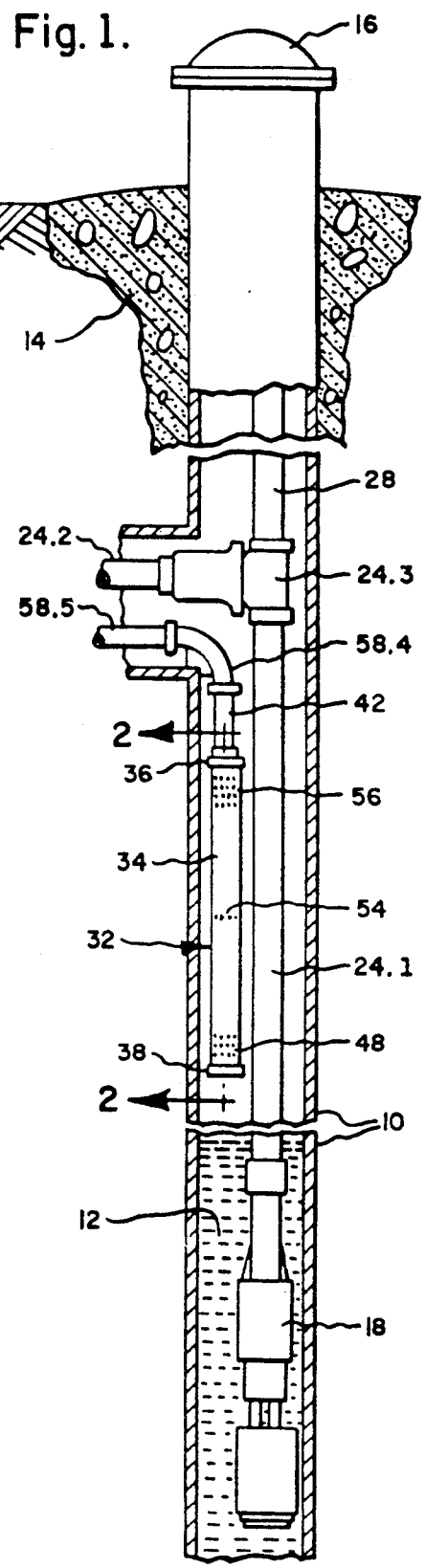

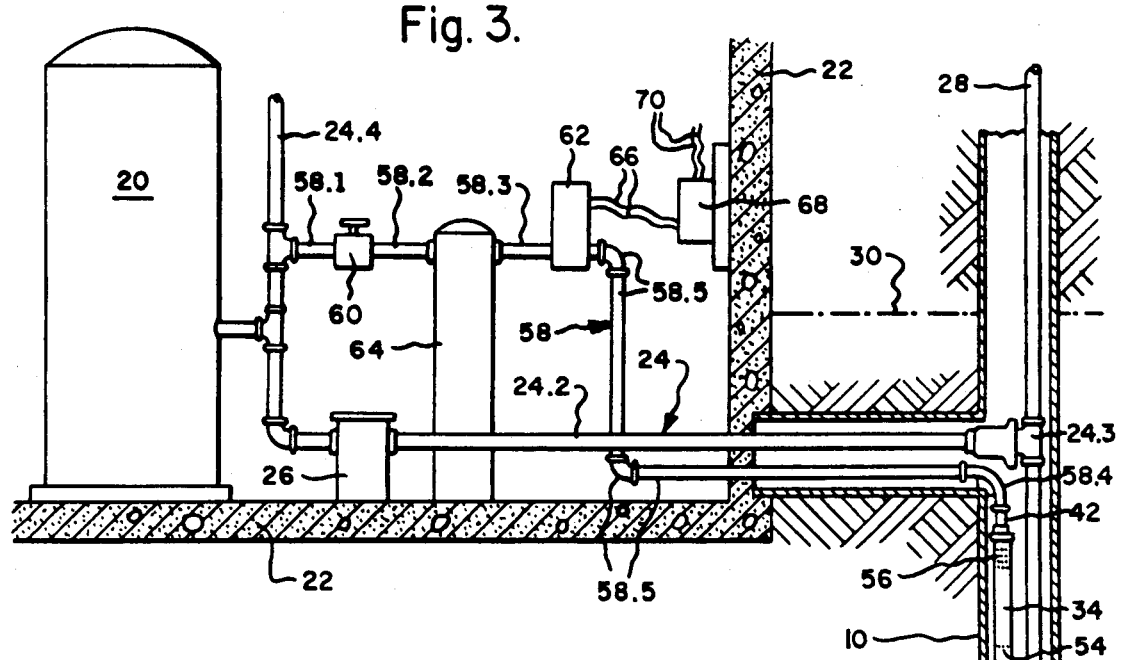
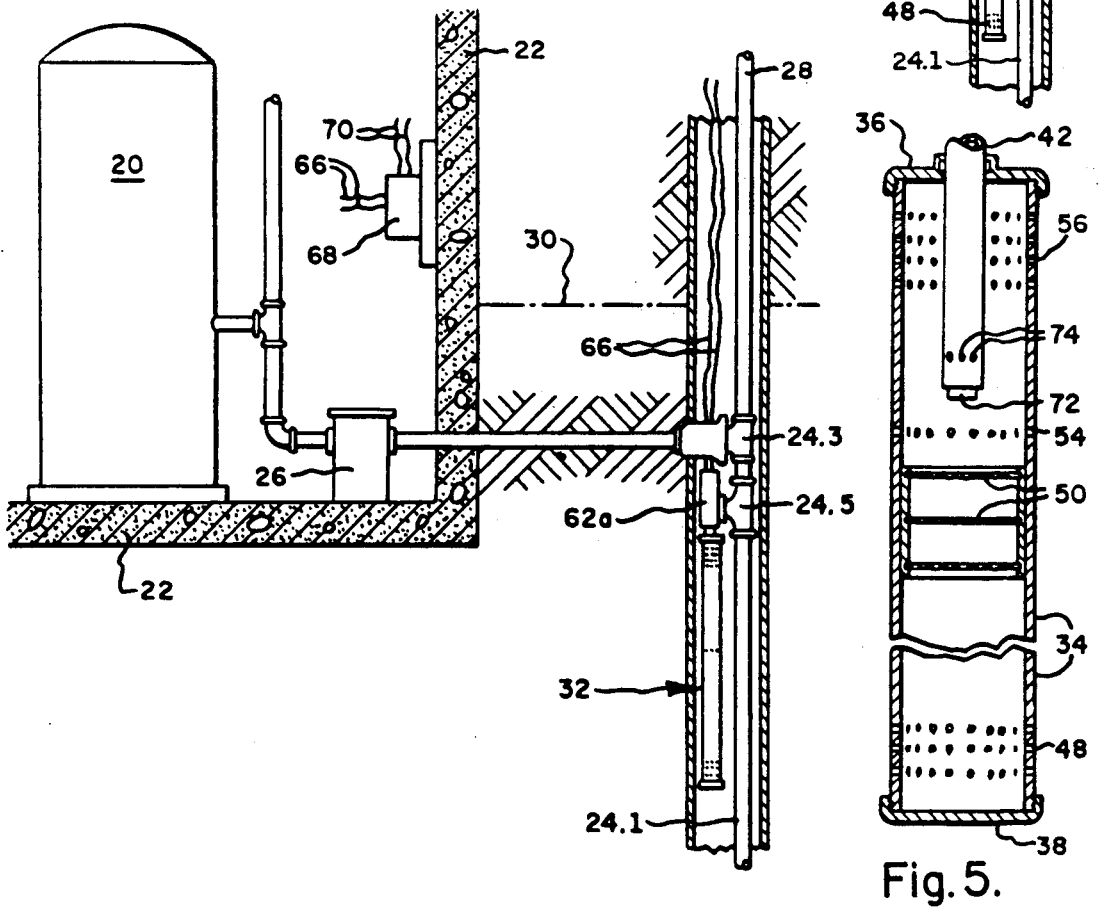

APPARATUS AND METHOD FOR TREATING WELL WATER

TECHNICAL FIELD

The present invention relates generally to an apparatus and method for treating well water, and more particularly to such an apparatus and method wherein gases in solution in the well water as well as dissolved iron and manganese may be disassociated from the water prior to consumption of the water.

BACKGROUND OF THE INVENTION

In many areas well water contains impurities such as dissolved iron or hydrogen sulfide as well as other gases or minerals which may be objectionable to the consumer. For example, if the water contains dissolved iron it will tend to oxidize when in contact with the air to cause the iron to precipitate. These precipitates frequently cause rust-colored stains which are very difficult to remove from porcelain surfaces such as toilet bowls, sinks and tubs. The hydrogen sulfide is disagreeable because of its characteristic rotten egg odor.

Typically, a home owner may try to eliminate some of these objectionable ingredients from their water supply by the employment of a water softener and filtration system, but such units are at best only marginally satisfactory when used with water supply systems having moderate to high hydrogen sulfide levels.

It has also been proposed in the past to use aeration systems within the home, one such example being shown in U.S. Pat. No. 3,193,989. The difficulties with such prior art systems are that they require not only a pump for the well, but an additional pump for delivering the water after aeration. Furthermore, as such systems are typically installed within a home, it is necessary to provide positive ventilation to insure that the hydrogen sulfide fumes are effectively dissipated. Because of the costs of such systems and the inherent difficulties of such systems they have not gained widespread acceptance.

In all prior systems known to applicant the basic premise has been to remove the water from the well with all of the dissolved minerals and gases therein, to treat the water in the home, and then to immediately use the treated water. Such prior art systems require that the treatment system be capable of removing all of the contaminants in a single pass through the system which place increasing demands on the system.

OBJECTS AND SUMMARY OF THE INVENTION

It is an object of the present invention to provide a water treatment system which is capable of removing dissolved minerals and gases from a water supply system, the treatment system being energy effective, easily maintained, of minimum bulk, cost effective, and effective.

More specifically, it is an object of the present invention to provide an aerating system which can be readily installed, and which is capable of treating a relatively large supply of water for future consumption.

The above objects and other objects of this invention are achieved by disposing an aerator within a well, the aerator being located between the frost line and the water table, and by directing water from the reservoir within the well through the aerator so that the aerator will cause gases such as hydrogen sulfide to be released from the water and will also cause dissolved iron and manganese to oxidize and precipitate out of the water so that the quality of the water within the reservoir is substantially improved. The water from the well may be brought into a residence or the like and then be returned to the aerator through a fluid line which can be provided with a filter, throttle valve, and a solenoid operated on-off valve which may be periodically operated to cause the reservoir water to be constantly recycled for improving its quality. Additionally, the aerator may be connected directly to the water line within the well through a solenoid operated valve which may also be connected to a timer for intermittent operation. In the foregoing systems a pressure sensing device will sense when the pressure is dropping through flow to the aerator and will initiate operation of the pump associated with the water supply system to insure continued operation during recycling as is well known.

The foregoing objects and other objects and advantages of this invention will become more apparent after a consideration of the following detailed description taken in conjunction with the accompanying drawings in which a preferred form of this invention is illustrated.

BRIEF DESCRIPTION OF THE DRAWINGS

FIG. 1 is a sectional view through a well which utilizes the aerator of this invention.

FIG. 2 is a sectional view of the aerator of this invention.

FIG. 3 illustrates a first embodiment of a system for water treatment in accordance with the principles of this invention.

FIG. 4 illustrates a second embodiment of a system for treating water in accordance with the principles of this invention.

FIG. 5 is a sectional view through an alternative form of aerator.

DETAILED DESCRIPTION

One form of a typical rural water supply is illustrated in the embodiment shown in FIGS. 1 and 3. Such a rural water supply typically includes a drilled well from 6-8 inches in diameter, the drilled well being lined with a steel or wrought iron well casing 10 to prevent the hole from caving in. The well casing may extend substantially all the way to the bottom of the well or may terminate somewhat above the bottom if the bottom of the well is in a relatively solid rock formation. In any event, the well casing extends considerably below the water table and forms a water reservoir 12 within the casing. As the drill hole is larger than the casing, particularly near ground surface, a cement grout 14 is disposed about the upper end of the well casing. A well seal 16 typically closes off the upper end of the well. Various types of pumping systems may be utilized to move the water from the reservoir 12 and in the embodiment illustrated a submersible pump 18 is illustrated. The pump is interconnected with a pressure tank 20 in a building (represented by cement floor and walls 22) by a water line 24, which water line may include a drop pipe 24.1 and a horizontal water line 24.2. The horizontal water line extends through a wall of the building and is suitably connected with the pressure tank 20. The water line 24.4 may be provided with a pressure switch (not shown) in which case there will be suitable valves to either side of the pressure switch. Additionally, the water line may be interconnected with a sand trap or filter, this being illustrated at 26. A lift out pipe 28 extends downwardly from the well seal 16 to a right angle fitting 24.3.

While one form of rural water supply has been described above it should be noted that many other forms are well known in the art. For example, a centrifugal jet pump may utilized rather than a submersible pump, and the jet pump may be located either inside the well casing, or alternatively, outside of the well casing. In addition, driven and dug wells may also be utilized rather than the drilled well illustrated in the drawing. The pressure tank may be disposed in an independent well building rather than in the basement of a residence or the like, in which case a different form of well head construction is utilized since the top of the well will not be subject to frost. In this regard, it should be noted that all pipes that carry water are typically disposed below the frost line which is indicated by the broken line 30. The size of the reservoir formed within the well will vary widely and it is desirable that the reservoir be of sufficient size that during normal use the water level will not fall to the level of the submersible pump (or to the ejector unit if a centrifugal jet pump is being utilized). As the details of conventional rural water supply systems are well known to those having ordinary skill in the art, such systems will not further be described in detail.

In many areas, particularly in areas underlain by shale, hydrogen sulfide gas is typically found in the water. In other areas dissolved minerals such as iron or manganese may also be encountered in the water. As has been indicated above, these substances may be eliminated by use of an aerator. In accordance with the principles of this invention, an aerator, indicated generally at 32, is disposed within the well casing 10. The aerator consists of a canister assembly preferably formed of a length of PVC piping 34 closed off at the ends by upper and lower end caps 36, 38, respectively. As can be seen the upper end cap 36 is provided with a fitting 40 through which a short length of relatively small diameter pipe 42, such as ½ inch, may extend. In the embodiment illustrated in FIGS. 1 through 3 the lower end 42.1 of the short length of pipe 42 is formed into a jet nozzle. Water discharged through this length of pipe will impinge upon a splash pan 44 supported by spaced apart legs 46 suitably interconnected with the pipe 42. A plurality of apertures 48 are formed in the lower end of the canister assembly. Disposed between the plurality of apertures 48 and the splash pan 44 are a number of screens 50, the screens being supported by a grooved cylindrical insert 52 which is suitably secured to the PVC pipe 34 in any conventional manner well known to those skilled in the art. A second plurality of apertures, or weep holes, 54 are formed through the canister assembly between the splash pan 44 and the screens 50, the weep holes 54 permitting the discharge of water from the canister in the event that the screens 50 become plugged. Disposed near the top of the aerator is a third plurality of apertures 56 through which gases released by aeration may exit from the canister assembly. In this regard it should be noted that the well seal and well casing are so designed that gases may move in and out of the well as the level of the reservoir moves up and down.

It should be obvious that if water is delivered through the jet nozzle 42.1 that it will impinge upon the surface of splash pan 44, breaking up into small droplets which facilitate the release of gases carried by the water and which also facilitates the oxidation of dissolved minerals. Such water will be further broken up as it passes through the screens 50 further releasing gases and oxidizing dissolved minerals which will precipitate out.

Delivery means are provided for delivering well water from the water line to the aerator. The delivery means includes fluid line means 58 and first and second valves 60, 62. The first valve is a throttle valve which is capable of progressively varying the rate of flow through the fluid line means 58, the first valve 60 being connected with the water line 24.4 which extends from the pressure tank 20 to the pressurized supply line 24.4 by means of a first length 58.1 of the fluid line. A filter or water softener 64 may be disposed between the first and second valves, the water softener being capable of further treating the well water. The filter or water softener 64 is connected with the first valve by a second length of the fluid line 58.2. A third length 58.3 of the fluid line extends between the filter or water softener 64 and the second valve 62. The second valve 62 is preferably a solenoid operated valve which is shiftable between open and closed positions in response to a electrical signal carried by wires 66. In the embodiment illustrated in FIG. 3 the fluid line means also includes an elbow 58.4 which is connected at its lower end to the short length of pipe 42 on the aerator 32. An intermediate portion of the elbow 58.4 is supported as illustrated, and the elbow is in turn interconnected with the second valve by additional lengths 58.5 of the fluid line means. It can thus be seen from FIG. 3 that the fluid line means acts in part as a mounting means for mounting the aerator within the well casing so that the well water delivered to the aerator will subsequently flow back into the reservoir. The aerator will cause gases such as hydrogen sulfide to be released from the water and will also cause dissolved iron and manganese to oxidize and precipitate out of the water so that the quality of the water within the reservoir is substantially improved.

As previously indicated the solenoid operated valve is controlled by electric current passing through wires 66, the wires 66 being in turn connected to a timer 68 which is powered by house current or the like though wires 70. The timing means may be of any conventional design and in one application it has been found desirable to cause the valve 62 to be open for a period of 4 minutes every 3 hours thus, causing water from the reservoir 12 to be delivered through the water lines 24 and thence through the fluid lines 58 to the aerator 32 wherein the water is treated. It has been found in the above application that hydrogen sulfide and dissolved iron have been substantially eliminated through the use of such system. However, in systems where there are greater concentrations it may be necessary to vary the settings of the throttle valve and/or the timer to cause more or less water to be recycled for longer or shorter periods of time and at more or less frequent time intervals. In addition it may also be necessary to use the filter and/or water softener 64. While the filter or water softener is shown in the return line 58, it could also be disposed within the supply line 24.4 to the residence.

In the embodiment shown in FIGS. 1 through 3 water to the aerator returns from the pressurized supply line 24.4 within the building 22. However, it is not necessary that the water to be aerated be returned from the building through a separate fluid line. Thus, as can be seen from FIG. 4, the drop pipe 24.1 may be provided with a T-fitting 24.5 disposed below the right-angle fitting 24.3, the T-fitting 24.5 in turn being connected with a solenoid operated valve 62a which is the functional equivalent of the solenoid operated valve 62 shown in FIG. 3. The wires 66 which connect the solenoid operated valve 62a with the timing means 68 may extend up through the top of the well in order to facilitate this form of installation, thus not requiring that the wires extend through the ground. In this form of design when the valve is opened water from the pressure tank within the building will initially flow to the aerator until the system pressure drops enough to cause the pump to become operational. During pump operation a portion of the water being delivered by the pump is aerated and returned to reservoir. Thus, the water from within the reservoir is recycled in a similar manner to system illustrated in FIG. 3, thereby effectively purifying the well water.

An alternate form of aerator is shown in FIG. 5 this design differing only in the construction of the jet nozzles and the surfaces upon which the waters will impinge. In this form of design the short length of pipe 42 is not provided with the single tapered jet nozzle as shown in FIG. 2, but is instead provided with a plug 72 at its lowermost end and one or more small holes 74 through which water may be discharged in radially extending jets, the jets impinging upon the inner cylindrical surface of the pipe 34 to initially break up the water.

While two separate systems have been illustrated in FIGS. 3 and 4 for treating well water, and while two separate forms of aerators have been illustrated in FIGS. 2 and 5, it should be noted that other systems and aerators may be employed in the practice of the broader aspects of this invention. Therefore, while preferred systems and structures in which the principles of the present invention have been incorporated have been shown and described above, it is to be understood that this invention is not to be limited to the particular details shown and described above, but that, in fact, widely differing means may be employed in the practice of the broader aspects of this invention.

What is claimed is:

1. In combination with a water supply system including a well of the type having a well casing which extends to a depth below the water table to establish a reservoir within the well casing, a water line running from the well into the building, and a pump for pumping water through the water line from the reservoir within the well to the building; wherein the improvement comprises an apparatus for treating the well water, the apparatus including delivery means and an aerator mounted above the reservoir, the delivery means including a fluid line for delivering well water from the water line to the aerator, the delivery means further including a variable flow valve for progressively varying the rate of flow through the fluid line, a two position solenoid valve within the fluid line, and automatic timing means for causing the solenoid valve to be switched between open and closed positions in accordance with a predetermined timed operation mode, the aerator causing gases such as hydrogen sulfide to be released from the water and also causing dissolved iron and manganese to oxidize and precipitate out of the water so that the quality of water within the reservoir is substantially improved.

2. In combination with a water supply system including a well of the type having a well casing which extends to the depth below the water table to establish a reservoir within the well casing, a water line running from the well into a building, and a pump for pumping water through the water line from the reservoir within the well to the building; wherein the improvement comprises an apparatus for treating well water, the apparatus including an aerator, and delivery means for delivering well water from the water line to the aerator, the delivery means including a fluid line extending between the aerator and the water line, and first and second valves disposed within the fluid line, the first valve being capable of progressively varying the rate of flow through the fluid line, and the second valve being shiftable between open and closed positions, a portion of the fluid line acting as mounting means for mounting the aerator within the well casing above the reservoir, the aerator causing gases such as hydrogen sulfide to be released from the water delivered to the aerator and also causing dissolved iron and manganese to oxidize and precipitate out of the water so that the quality of the water within the reservoir is substantially improved.

3. The combination as set forth in claim 2 wherein the second valve is solenoid operated, and the combination further being characterized by the provision of timing means for causing the second valve to be switched between open and closed positions in accordance with a predetermined time operation mode.

4. In combination with a water supply system including a well of the type having a well casing which extends to a depth below the water table to establish a reservoir within the well casing, a water line running from the well into a building, and a pump for pumping water through the water line from the reservoir within the well to the building; wherein the improvement comprises an apparatus for treating the well water, the apparatus including an aerator and delivery means for delivering well water from the water line to the aerator, wherein the aerator includes a canister assembly, a jet nozzle disposed within an upper portion of the canister assembly, a plurality of apertures extending through the canister assembly below the jet nozzle and a surface within the canister assembly below the jet nozzle and above the plurality of apertures, the surface being in line with the jet nozzle so that water can impinge the surface during operation of the delivery means to breakup the water into small droplets, and the delivery means including mounting means for mounting the aerator within the well casing above the reservoir so that well water delivered to the aerator will subsequently flow back into the reservoir, the aerator causing gases such as hydrogen sulfide to be released from the water and also causing dissolved iron and manganese to oxidize and precipitate out of the water so that the quality of the water within the reservoir is substantially improved.

5. The combination set forth in claim 4 wherein the canister assembly further includes a plurality of screens disposed within the canister assembly below the jet nozzle and said surface through which the water may pass to further breakup the water so that dissolved gases and minerals may be liberated and oxidized, respectively, and a plurality of apertures extending through the canister assembly below the screens, the aerated water normally being discharged through said plurality of apertures to the reservoir within the well.

6. The combination as set forth in claim 5 wherein the surface is a splash pan mounted below the jet nozzle.

7. The combination as set forth in claim 5 wherein a second plurality of apertures extend through the canister assembly at a location between the jet nozzle and the screens to permit the discharge of water in the event that the screens are plugged.

8. The combination as set forth in claim 5 wherein the canister assembly is formed from PVC piping, the piping being closed off at either end by end caps.

9. The combination as set forth in claim 5 wherein said surface is the sidewalls of said canister assembly.

* * * * *